United States Patent [19]

Carroll et al.

[11] 4,213,012
[45] Jul. 15, 1980

[54] DISCRIMINATING MEANS FOR TELEPHONE CIRCUITS

[75] Inventors: Michael H. Carroll; Richard J. Taylor; Peter J. McCubbin, all of Owen Sound, Canada

[73] Assignee: General Signal Corporation, Stamford, Conn.

[21] Appl. No.: 957,379

[22] Filed: Nov. 3, 1978

[51] Int. Cl.² ............................................. H04M 1/74
[52] U.S. Cl. ................................................. 179/84 R
[58] Field of Search ................ 179/81 R, 84 R, 84 T

[56] References Cited

U.S. PATENT DOCUMENTS 4,152,549   5/1979   Ceruti et al. ........................ 179/84 R Primary Examiner—Stuart N. Hecker
Assistant Examiner—Joseph A. Popek
Attorney, Agent, or Firm—John Ohlandt; Milton E. Kleinman

[57] ABSTRACT

An electronic circuit for use with telephone instruments or the like in those cases where so-called "dial tap" is encountered, whereby a buzzer or bell included as part of the telephone instrument is adversely affected when the dial is rotated for purposes of dialing a particular call number. The circuit provides a discriminating function against the short term dial pulses by blocking them, but allows ringing current to pass substantially unaffected.

1 Claim, 4 Drawing Figures

DISCRIMINATING MEANS FOR TELEPHONE CIRCUITS

BACKGROUND OF THE INVENTION

The present invention pertains to electronic circuitry and particularly to a specialized circuit useful in telephone communication.

It is well-known in the telephone communication arts to provide at a telephone sub-station a suitable dial or other device for interrupting a DC path on a repetitive basis so as to transmit dial pulses that affect switching systems at a central station. It happens that in certain types of telephone systems it is required that the bell, buzzer, or other audible means used to indicate an incoming call, be continuously in circuit with the dial means or other instrumentality that is connected across the lines.

The difficulty or problem that arises in a telephone subset context when the aforesaid conditions apply is that so-called "dial tap" is encountered, that is to say, the buzzer, bell or other audible means for signaling an incoming call necessarily operates in response to the dial pulses placed on the line as the dial means is being rotated in effecting its purposes. In other words, an annoying sound is heard by the user of the telephone instrument when he is trying to dial out on the line.

Accordingly, it is a primary object of the present invention to overcome the problem or difficulty of "dial tap" as it is encountered in certain telephone systems.

Another object is to accomplish the successful overcoming of the aforestated problem in a very simple, low-cost way.

A further object is to provide a simple electronic circuit in a package that can be interposed between the conventional telephone lines and the buzzer device.

The above and other objects are achieved and implemented by a primary feature of the present invention according to which an electronic circuit that operates as a discriminating means is provided for insertion between the so-called "line" terminals of a telephone instrument and the "device" terminals, which are the terminals directly connected to a buzzer, bell or other audible device. This discriminating means functions so as to block the passage of the repetitive dial pulses and prevent them from affecting the buzzer device, while permitting conventional or regular ringing current of appropriate frequency to pass to the buzzer device thereby to actuate such device and to make audible to the user the fact that there is an incoming call.

The discriminating means operates by reason of a suitable time delay arrangement which is effective, in the case of the extended time period of the ringing signal, to actuate a latching device, such as a silicon controlled rectifier or similar device. On the other hand, since the dial pulse signals that would ordinarily cause the annoying dial tap problem are of short duration, that is, on the order of less than 100 milliseconds, these will not be effective to cause actuation of the latching device and hence the path for transmission of such dial pulses will be completely blocked. Moreover, means are provided that prevent build-up of the succession or series of dial pulses from affecting the latching device and causing spurious operation.

Other and further objects, advantages and features of the present invention will be understood by reference to the following specification in conjunction with the annexed drawing, wherein like parts have been given like numbers.

DESCRIPTION OF PREFERRED EMBODIMENT

Figure 1:
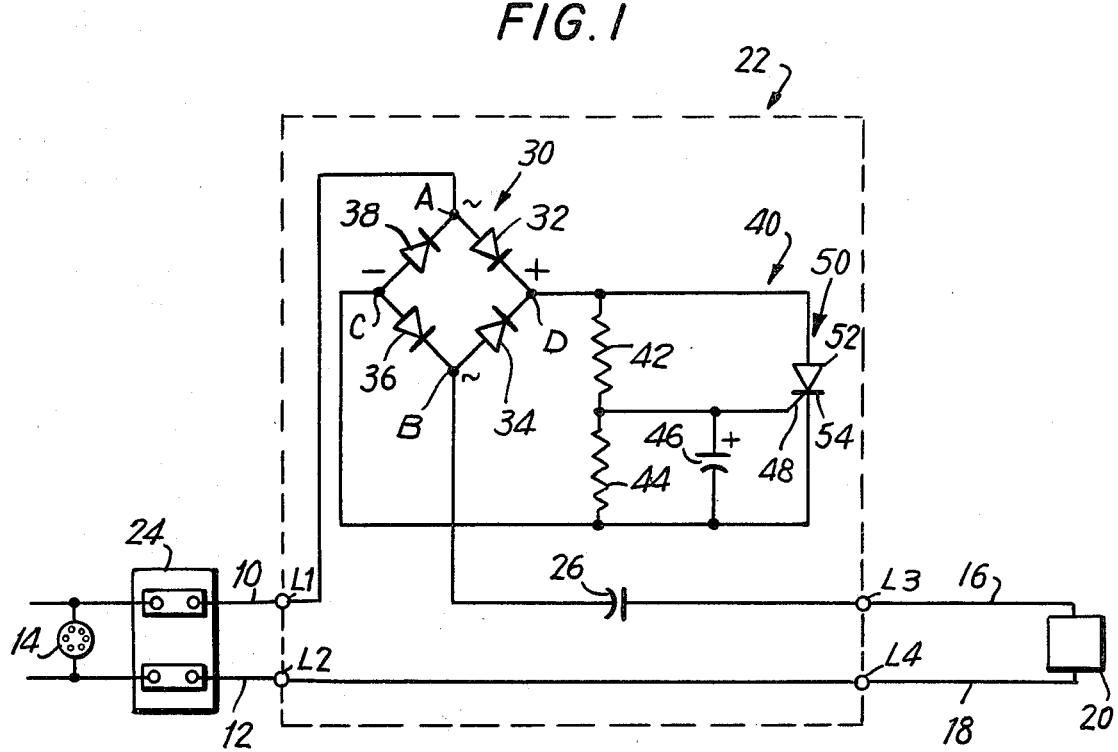
FIG. 1 is a schematic diagram illustrating the electronic circuit that provides discrimination against unwanted signals in a telephone or communication environment.

Referring now to FIG. 1, there is illustrated a schematic diagram of the electronic circuit in accordance with the preferred embodiment of the present invention. Seen on the left are a pair of telephone lines 10 and 12 suitably connected to terminals designated L1 and L2. Across the lines will be seen a conventional dialing means 14 for purposes well understood; that is, to provide a series of pulses over the lines to switching equipment at a central station or the like. On the right of FIG. 1 there will be seen a corresponding pair of lines 16 and 18 connected to another pair of terminals L3 and L4 and also connected to a buzzer device 20. Such buzzer device is a conventional one and operates normally to signal or indicate that an incoming call has arrived.

Figure 2:
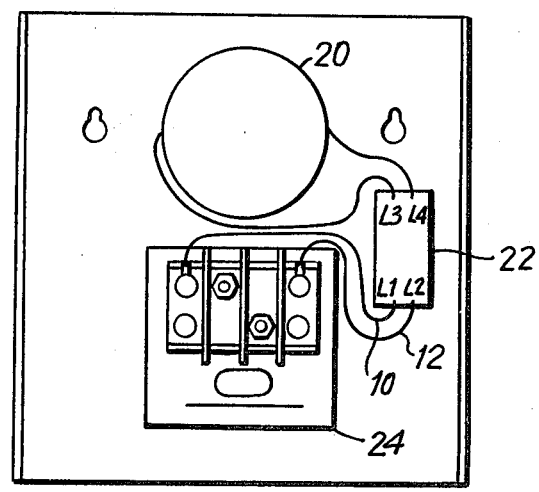
FIG. 2 is a plan view of the telephone instrument context in which the present invention operates, such view showing or illustrating a terminal block, a buzzer or bell assembly, and a printed circuit board or the like containing the circuit of the present invention.

The several terminals L1, L2, L3 and L4 are included as part of a container or package 22 as shown in dotted lines in FIG. 1, such container serving for purposes of surrounding the various components utilized in accordance with the invention. This package 22 is also seen in FIG. 2, interposed between a terminal block 24, to which lines 10 and 12 are connected from terminals L1 and L2, and the buzzer device 20; connection also being provided from terminals L3 and L4 to the buzzer device 20.

Inside the package 22 there is included a capacitor 26, such capacitor being one that is conventionally or normally supplied in series with a typical bell or buzzer such as the buzzer device 20. It is simply included as part of the package 22 for convenience of wiring and interconnection with a conventional telephone device.

As will be appreciated, the buzzer device 20 is connected as part of an AC circuit which can be traced from incoming line 10 and, by way of capacitor 26, through the buzzer device and return by line 12. In other words, the buzzer device is so connected that it will operate in all respects the same way it would have operated if the arrangement in accordance with the present invention had not been included in the circuit and if, instead of interposing the circuit of the present invention, the L1 terminal had been connected directly to capacitor 26.

However, in accordance with the present invention, a discriminating means or circuitry is provided within the package 22. Thus it will be seen that the terminal L1 is connected to the upper apex of a bridge rectifier device 30, the upper apex being designated A while the lower is designated B and the left and right apexes are designated C and D. Included in the bridge rectifier means are diodes 32, 34, 36, 38 connected in conventional fashion.

Because of the conventional bridge rectifier connections, whereby the bridge rectifier 30 operates to provide full wave rectification, the required discriminating function can be achieved by the present invention through the arrangement designated 40 which includes a voltage divider network comprising resistors 42, 44. In shunt with resistor 44 there is connected a capacitor 46 which in turn is connected at its upper end to gate electrode 48 of a latching device 50. This latching device would preferably be a silicon controlled rectifier of well-known design. The anode and cathode of device 50 are designated 52 and 54, respectively.

OPERATION

The discriminating means or circuit of the present invention operates to fulfill the criteria stated at the outset, namely, to prevent or preclude dial pulses or the like, which are short duration pulses, from affecting the buzzer device and causing false ringing or annoying "dial tap". This is accomplished because when a dial pulse or a series of dial pulses is initiated across the lines 10 and 12, such pulses are transmitted through the bridge rectifier 30 and are transmitted to the discriminating means per se; namely, to the time delay arrangement provided by resistor 42 and capacitor 46. The RC time constant of this part of the network is so chosen that insufficient charge will build up, during the short dial pulse period, on capacitor 46, whereby insufficient bias voltage will appear on gate 48 of SCR device 50. Hence, this device will remain in the non-conducting state and therefore will act to block such dial pulses so that they cannot be transmitted through capacitor 26 to the buzzer device 20.

Figure 3A:
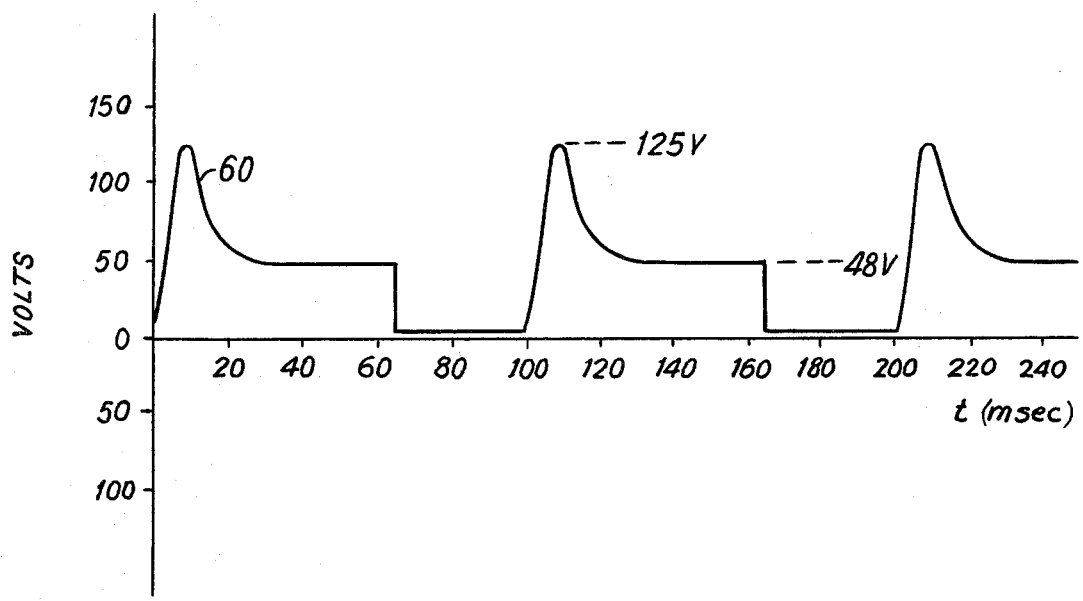
FIG. 3A depicts a wave form of dial tap signals which are encountered in the operation of a telephone system in which applicants' invention is to be incorporated.

The aforesaid dial pulses have a total time period of the order of 100 milliseconds; however, as will be seen by reference to FIG. 3A, the only part of the pulse wave form 60 that could cause actuation of the buzzer is the first 30 milliseconds. Accordingly, the RC values, that is, the values of resistor 42 and capacitor 46, are selected with this factor in mind to prevent a build-up of charge on the capacitor 46 sufficient to trigger SCR 50. Thus, it is required that a voltage of 0.8 volts build up on capacitor 46 to trigger SCR 50 and this will not occur unless an incoming signal is applied for at least 100 milliseconds. Moreover, in the case of a series of dial pulses, as also illustrated in FIG. 3A, there will be no integrational build-up of charge on capacitor 46 because resistor 44 will function to discharge capacitor 46 during the interval between pulses.

Figure 3B:
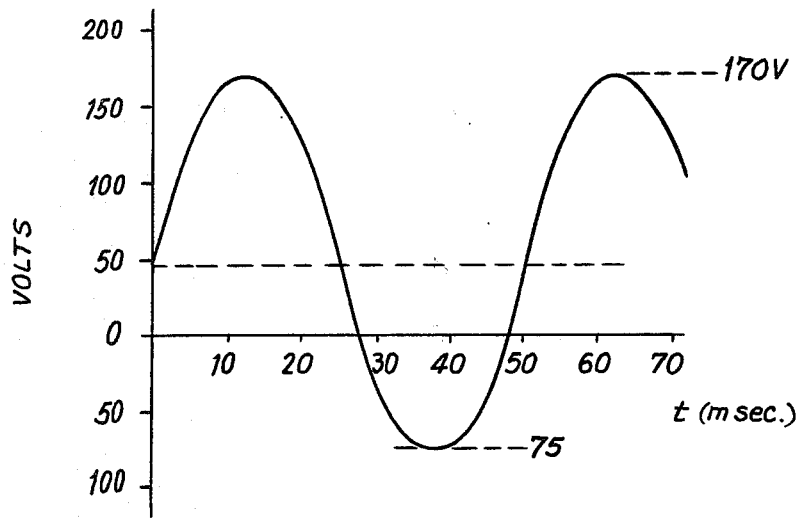
FIG. 3B depicts a wave form for conventional ringing signals in connection with the operation of the invention.

In the event, however, that ringing tone or signal, as illustrated in FIG. 3B, appears on lines 10 and 12, this ringing signal will be appropriately modified; that is, it will be converted to pulsating DC by reason of bridge rectifier 30. The ringing signal, however, will persist for a second or more, and will be transmitted with the slight imposed time delay of 100 milliseconds to the buzzer device 20. This happens because charge will now build up sufficiently on capacitor 46 such that it reaches the threshold voltage of the gate electrode of latching device 50. Consequently, this device 50 will go into its conductive state and, therefore, a substantially short circuit will exist across the bridge terminals or apexes C and D once this happens. Although charge will leak off capacitor 46, that is, the capacitor will tend to become discharged and even approach the zero level, nevertheless the latching device 50 once having been actuated will remain on and will provide a continuous path for the ringing signal.

The only difference from a conventional operation when the ringing tone or signal appears is that, as noted previously, there will be the initial time delay until capacitor 46 has charged up sufficiently. Otherwise, the operation of the buzzer device is the same as it would be normally without the circuit of the present invention connected to it.

In order to provide the man skilled in the art with a detailed set of specifications for practicing the electrical circuit, the following is provided:

Resistors:
  42 56 Kohm, ¼ w
  44 1 Kohm, ¼ w
Capacitors:
  26 0.47 uf, 250 v
  46 100 uf, 3 v
SCR:
  50 2N5064
Bridge rectifier:
  30 General Instr. WO4M, 1.5 amp. 400 PIV
Buzzer device:
  20 Edwards Catalog 950-3

What has been disclosed in accordance with the present invention is an extremely simple, low-cost and effective discriminating means or circuit that eliminates the problem encountered when dial pulses are sent out on certain lines, in particular, telephone systems. The discriminating means is able to block the AC pathway when such short period pulses appear and to close such pathway when the desired ringing signals appear on the telephone lines.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. In a telephone system including a dial means connected across telephone lines and a buzzer device, the improvement which comprises symmetrical means for discriminating against a succession of short time period dialing pulses or the like so that such pulses will not actuate said buzzer device, while permitting ringing signals to be transmitted to said device, said discriminating means comprising a voltage divider, including a pair of resistors connected directly in series, a capacitor in shunt with one of said resistors;

a latching device, having a gate electrode and output electrodes, the output electrodes thereof being connected to the ends of said pair of resistors;

said capacitor being connected to the gate electrode of said latching device such that a transmission path for ringing signals is established, regardless of polarity of said signals, when said latching device has been rendered conductive in response to a threshold voltage built up on said capacitor;

said other resistor and said capacitor forming a timing network such that a predetermined time period must be exceeded for said threshold voltage to be attained such that said latching device will e actuated;
a full wave rectifying bridge network including a plurality of diodes, said resistors directly connected in series being connected to opposite apexes of said bridge network, the other apexes of said bridge network being connected in series with said buzzer device across said telephone lines.

* * * * *